Oct. 17, 1933.  M. E. BIVENS  1,931,127

FAULT RESPONSIVE APPARATUS

Original Filed Oct. 20, 1930

Inventor:
Maurice E. Bivens,
by Charles E. Mullen
His Attorney.

Patented Oct. 17, 1933

1,931,127

UNITED STATES PATENT OFFICE 1,931,127

FAULT RESPONSIVE APPARATUS

Maurice E. Bivens, Scotia, N. Y., assignor to General Electric Company, a corporation of New York Application October 20, 1930, Serial No. 489,758
Renewed July 22, 1933

11 Claims. (Cl. 175—294)

My invention relates to improvements in fault responsive apparatus for electric circuits and more particularly to improvements in fault responsive protective apparatus and arrangements thereof wherein discriminating action is obtained by a comparison of electric characteristics of a circuit at different points thereof so that, on the occurrence of abnormal circuit conditions, faulty sections of the circuit can be eliminated without impairing continuity of service in the sound sections.

My invention is, further, an improvement on protective systems of the type disclosed in United States Letters Patent 1,797,976 and also described by A. S. Fitz Gerald in an article entitled "A carrier-current pilot system of transmission line protection" and published in the transactions of the American Institute of Electrical Engineers, vol 47, January 1928, pages 22–29. As set forth therein, a transmitter, located at one point of the circuit to be protected, is operative to transmit a wave of a given frequency only during alternate half cycles of the circuit current at this point. A receiver tuned to the frequency of this wave is located at another point of the circuit and is operative to receive only during alternate half cycles of the circuit current at this other point. Normally and on faults external to the section between the two points, the circuit currents at both points are substantially in phase but in case of an internal fault are substantially 180° out of phase. When the phase relation of current at the two points indicates that the fault is not between the points, the transmitter and the receiver are simultaneously operative and the circuit is not opened thereby. When the phase relation of current at the two points indicates a fault between the points, the transmitter and receiver are not simultaneously operative and a circuit interrupter under the control of the receiver is opened. While there is obtained a comparatively wide range in phase relation over which circuit opening operation may be effected, conditions frequently arise, particularly in long lines where the current phase relation under fault conditions may differ very much from 180°. An object of my invention is, therefore, to extend the range of phase relation over which circuit opening operation can be effected without causing unnecessary circuit interruptions.

My invention will be better understood from the following description when considered in connection with the accompanying drawing and its scope will be pointed out in the appended claims.

Figure 1:
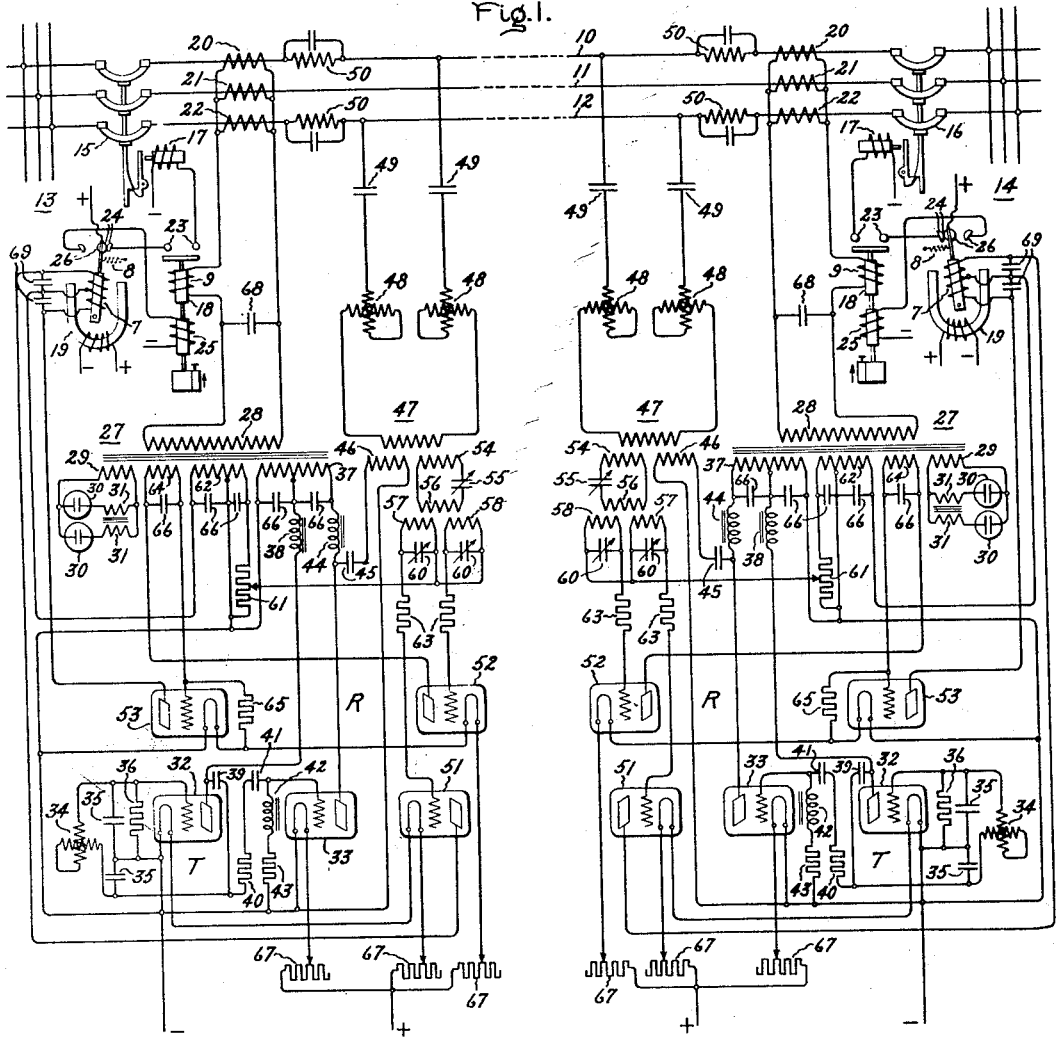
Figure 2:
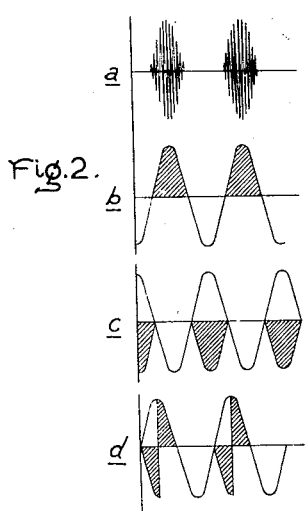
Figures 3, 4:
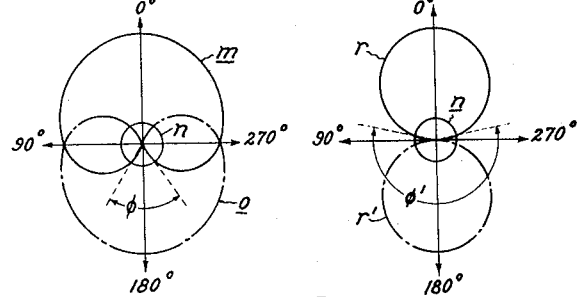

In the accompanying drawing, Fig. 1 illustrates diagrammatically an embodiment of my invention; Fig. 2 illustrates wave forms explanatory of my invention and Figs. 3 and 4 are polar diagrams explanatory of my invention.

I have shown in Fig. 1, for the purpose of illustrating my invention, an embodiment thereof as applied to a section of a polyphase circuit 10, 11, 12 for protection against ground faults. The section is shown as extending between two points such as stations or busses 13, 14 from which and the rest of the system the section can be isolated by suitable circuit interrupting means illustrated as latch-closed circuit breakers 15 and 16 having trip coils 17.

For controlling the circuit breaker at each station there is provided a tripping relay 18, a receiver relay 19, an oscillation transmitter T and a receiver R, the receiver at each station being tuned to the frequency of the transmitter at the other station.

As illustrated, the tripping relay 18 is of the time delay overcurrent type and in order to respond to ground faults has its operating winding 9 connected in series with the parallel connected secondaries of current transformers 20, 21, 22 respectively associated with the phase conductors 10, 11, 12 whereby the winding is energized in accordance with the vector sum of the currents in these conductors. The receiver relay 19 is shown as of the double-throw polarized directional type such as is disclosed, for example, in United States Letters Patent 1,541,618, granted June 9, 1925, to the assignee of this invention. The tripping relay and the receiver relay conjointly control the circuit of the trip coil 17 through their series connected contacts 23 and 24 respectively, the latter being biased to the closed position by a spring 8. In order to prevent false operation of the tripping relay 18, it may also include a restraining winding 25 which is under the control of the receiver relay 19 through the contacts 26 thereof. When this restraining winding 25 is energized, it prevents the tripping relay 18 from closing its contacts 23 regardless of the magnitude of the current in its operating winding 9.

As illustrated, the transmitters T and the receivers R are of the thermionic electric discharge valve type and are connected to the circuit 10, 11, 12 for anode and control electrode excitation corresponding to ground faults or in accordance with the vector sum of the currents in the phase conductors 10, 11, 12 through suitable means such as a transformer 27 whose primary 28 is connected in series with the parallel connected secondaries of the current transformers 20, 21, 22. In order to prevent the excessive anode and control electrode voltages which would occur with severe faults, the transformers 27 may be provided with suitable voltage regulating means. This is shown as a secondary winding 29 across which are connected two glow discharge tubes 30 in series with the windings 31 of a balancing transformer, the arrangement being such that regardless of which tube breaks down first, the voltage on the other tube is momentarily increased to insure its break down. There are thus provided two parallel current paths of sufficient capacity to take care of the worst fault condition.

The transmitters T and the receivers R are operative on alternate half cycles of the circuit current, residual current as illustrated, at their respective locations. The transmitters may operate alternately or simultaneously and also the receivers but in order to reduce the number of frequencies required each transmitter may operate at the same frequency in which case the transmitters and receivers are so arranged that when the transmitters are transmitting simultaneously neither receiver can receive but when the transmitters are transmitting alternately the receiver at either station can receive only from the transmitter at the other station.

The transmitters T are shown as including two electric discharge valves or tubes 32 and 33 which are respectively a master oscillator tube and a power amplifier tube. The control electrode or grid circuit of the oscillator tube 32 includes the tuning inductance 34, the tuning condensers 35 and a leak resistance 36. The anode or plate circuit includes a part of the secondary winding 37 of the transformer 27 and the plate inductance or choke 38. The grid circuit of the amplifier tube 33 includes the plate blocking condenser 39, the coupling resistance 40, the coupling condenser 41, the inductance or choke 42 and the leak resistance 43.

The plate circuit of the amplifier tube 33 includes the whole of the secondary winding 37 and the plate inductance or choke 44. The transmitter output circuit includes the blocking condenser 45 and the winding 46 of a coupling transformer 47 which is, in turn, coupled through inductances 48 and condensers 49 to the channel of communication. This, as illustrated, includes two of the phase conductors 10 and 12, although any suitable conducting medium or even space transmission of the carrier wave may be utilized. In order to confine the carrier waves of the transmitters to the circuit section with which they are associated, the phase conductors over which the carrier is transmitted are provided with suitable trap circuits 50 which offer a high impedance to the transmitted wave but substantially no impedance to power currents.

In accordance with my invention, I so arrange that the receiver relay 19 is differentially operated in dependence on the phase relation of current at the stations 13, 14. One way in which this can be done is to have the receivers R include means for producing two similar quantities of electric energy which are dependent on the phase relation of current, ground fault current in the case illustrated, at the points where the transmitter T and its cooperating receiver R are located. For this purpose and also in order not to interfere with the sequence of operation of each transmitter and its cooperating receiver, particularly where it is desired to operate the transmitters at the ends of the section at the same frequency, I prefer to use a receiver of the form illustrated. This receiver is, in effect, two receivers which may be termed a direct receiver and a compensating receiver and which in the illustrated embodiment of my invention, provide two currents, as the similar quantities of electric energy. The plate currents of these receivers are supplied to the operating winding 7 of the receiver relay 19 so as to energize the same in accordance with their difference. The direct receiver includes a control detector such as the biased detector tube 51 and the compensating receiver includes a compensating detector such as the biased detector tube 52 and a co-operating compensating control tube 53 which normally has no bias. The plate circuits of the tubes 51 and 53 are connected differentially to the operating winding 7 of the receiver relay.

The grids of the detector tubes 52, 51 are coupled to the transmission circuit through a tuned link circuit which includes the winding 54 of the coupling transformer 47, a tuning condenser 55 and the primary winding 56 of an impedance matching transformer. The secondary windings 57, 58 of this transformer are respectively shunted by tuning condensers 60 and are connected to a grid biasing resistor 61 which is connected across a part of the secondary winding 62 of the transformer 27. Each grid circuit may include a grid current limiting resistor 63.

The plate or output circuit of the detector tube 51 includes a portion of the operating winding 7 of the receiver relay and is excited from a portion of the secondary winding 62 of the transformer 27. The output of the detector tube 52 is, however, in accordance with my invention, used to effect the operation of the compensating control tube 53. For this purpose, the plate circuit of the detector tube 52 includes, besides its excitation transformer winding 64, a grid biasing resistor 65 and the grid circuit of the tube 53. The plate or output circuit of the compensating control tube 53 includes the rest of the operating winding 7 of the receiver relay and is excited from the transformer secondary 62. The connections and arrangement of parts are such that the resultant magnetomotive force of the operating winding 7 of the receiver relay is dependent on the difference between the currents in the plate circuits of the detector tube 51 and the compensating control tube 53.

The secondary excitation windings of the transformer 27 may be provided with by-pass condensers 66 to keep the high frequency currents out. Inasmuch as the vector sum of the power currents in the phase conductors 10, 11, 12 is substantially zero, except in the case of ground faults, there is normally no voltage on the plates and grids of the transmitter and receiver tubes. Consequently, in order to obtain quick action in case of faults, the tube cathodes or filaments can normally be maintained at full emission temperature from a source indicated by plus and minus signs through control resistances 67.

Since the load on any excitation transformer 27 consists of a transmitter or appreciable load during a half cycle and a receiver or practically no load on the next half cycle, this load variation or unbalance tends to produce harmonics in the voltages furnished by the transformer 27. When the primary or earth fault exciting current is of sine wave form, a condenser 68 connected across the parallel connected current transformer secondaries permits the necessary distortion in the primary current fed to the transformer 27 to insure a good plate voltage wave characteristic, that is substantially a sine wave. Also in case of a fault, the condenser 68 balances the magnetizing currents of the idle current transformers and the voltage transformer 27 to provide a better power factor, that is near unity. By thus increasing the power factor of the load on the current transformer carrying the fault current, the available excitation for the protective system is utilized to the best advantage.

The operation of my invention will be better understood from the following discussion of Figs. 2, 3 and 4. In Fig. 2, part $a$ represents the carrier wave transmitted by a transmitter T during alternating half cycles of the fault current where the transmitter is located. If the fault current where the cooperating receiver is located is in phase with the fault current at the transmitter location, then the receiver tubes 51 and 52 at one station receive from the cooperating transmitter at the other station, as indicated by the shaded portions in Fig. 2, part $b$. If a ground occurs between the stations then the fault currents flow from each station towards the ground or are 180° out of phase, the receiver tubes 51 and 52 cannot receive, as indicated by the continuous full line wave Fig. 2, part $c$. If the fault currents at the two stations are 90° out of phase, then the receiver tubes 51 and 52 can receive, as indicated by the shaded portions above the horizontal axis, Fig. 2, part $d$. Since smoothing condensers 69 are connected across the two portions of the operating winding 7 of the receiver relay, these pulsating currents are to be considered on the basis of their average values. Thus, if we consider the average value of the plate currents of either of the detector tubes 51 and 52 through a 360° range in phase relation of fault currents, there results the full line polar curve $m$ of Fig. 3. The difference between the outputs of two such detectors, assuming alternate half cycle operation of the transmitter and the cooperating receiver, would be zero.

Considering them for the moment only the detector tube 51 and assuming that the circle $n$ represents the current necessary to actuate the receiver relay to close its contacts 26, then this relay would be operative to assist in tripping by keeping its contacts 24 closed only through the angle, the phase range throughout which the radii vectors of the curve $m$ are less than the radius of the circle $n$. Considering now that part of the receiver R which includes the tubes 52 and 53, it will be observed that the compensating tube 53 has no bias when the detector tube 52 is not supplying plate current since the grid of tube 53 is connected directly to its filament through the coupling resistor 65. Therefore, this tube 53 furnishes full plate current as indicated by the shaded portions below the horizontal axis in Fig. 2, part $c$ whenever plate voltage is applied and the incoming wave or signal is 180° out of phase with the plate voltage. As this phase angle is varied, the compensating detector 52 furnishes a bias to the control tube 53 and thereby determines the value of compensating current that should be furnished to counterbalance the value of the detector tube 51 as indicated by the shaded portions below the horizontal axis in Fig. 2, part $d$. In other words, the two tube receiver has a reversed polar characteristic as represented by the dash-dot line $o$ of Fig. 3.

Now, since the current outputs of the two receivers act differentially on the receiver relay 19, the polar operating characteristic of this relay is the difference between the polar characteristics $m$ and $o$, Fig. 3, and is represented by the full line curve $r$ and the dash-dot curve $r'$ of Fig. 4. These two curves merely distinguish between the directions of the differential current in the receiver relay operating winding. Thus, throughout the curve $r'$, the resultant current effect is such as to tend to maintain the contacts 24 of the receiver relay closed and thereby to help effect tripping. This is over a range of phase difference between the fault currents at the ends of the section indicated by the angle $\phi'$ or over 180°, that is for phase displacements of somewhat more than 90° either side of the 180° position. This angle of trip, as it may be designated, is determined by the intersections of the relay pick-up current curve $n$ with the curve $r$. Throughout the portion of the curve $r$ above its intersection with the receiver relay curve $n$, the difference current values are greater than the pick-up current of this relay, but the difference current is now in a direction to cause the receiver relay 19 to operate and open its contacts 24 so as to prevent tripping. It will, therefore, be observed that the operation of the receiver relay 19 is based on combined differential and directional functions dependent on the phase relation of the fault currents at the ends of the circuit section to be protected.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In combination, an electric circuit, an oscillation transmitter at one point of the circuit connected to be controlled therefrom and a receiver at another point of the circuit connected to be controlled therefrom and tuned to the frequency of said transmitter, said receiver including means for producing two similar quantities of electric energy dependent on the phase relation of current at said points.

2. In combination, an electric circuit, an oscillation transmitter at one point of the circuit connected to be controlled therefrom and a receiver at another point of the circuit connected to be controlled therefrom and tuned to the frequency of said transmitter, said receiver including means for producing two similar quantities of electric energy dependent on the phase relation of current at said points and means responsive to a function of said quantities for controlling said circuit.

3. In combination with an electric circuit, an oscillation transmitter at one point of the circuit, a receiver at another point of the circuit tuned to the frequency of the transmitter, said transmitter and receiver being controlled each in accordance with the direction of the circuit current at its point and said receiver including means for producing two similar quantities of electric energy dependent on the phase relation of current at said points.

4. In combination with an electric circuit, an oscillation transmitter at one point of the circuit, a receiver at another point of the circuit tuned to the frequency of the transmitter, said transmitter and receiver being controlled each in accordance with the direction of the circuit current at its point and said receiver including means for producing two similar quantities of electric energy dependent on the phase relation of current at said points, and means responsive to a function of said quantities.

5. In combination with an electric circuit, an oscillation transmitter at one point of the circuit, a receiver at another point of the circuit tuned to the frequency of the transmitter, said transmitter and receiver being controlled each in accordance with the instantaneous direction of the circuit current at its point and said receiver including means for producing two currents dependent on the phase relation of current at said points.

6. In combination with an electric circuit, an oscillation transmitter at one point of the circuit, a receiver at another point of the circuit tuned to the frequency of the transmitter, said transmitter and receiver being controlled each in accordance with the instantaneous direction of the circuit current at its point and said receiver including means for producing two currents dependent on the phase relation of current at said points, and means connected to be energized in accordance with the difference between said receiver currents.

7. In combination, an electric circuit, an oscillation transmitter at one point of the circuit connected to be controlled in accordance with the circuit current at said point and coupled to said circuit for transmission thereover, and a receiver at another point of the circuit connected to be controlled in accordance with the circuit current at said point, tuned to the frequency of the transmitter and coupled to the circuit for reception from the transmitter, said receiver including means for producing two currents dependent on the phase relation of current at said two points.

8. In combination, an electric circuit, an oscillation transmitter at one point of the circuit connected to be controlled in accordance with the circuit current at said point and coupled to said circuit for transmission thereover, and a receiver at another point of the circuit connected to be controlled in accordance with the circuit current at said point, tuned to the frequency of the transmitter and coupled to the circuit for reception from the transmitter, said receiver including means for producing two currents dependent on the phase relation of current at said two points and directional relay means connected to be energized in accordance with the difference between said receiver currents for controlling said circuit.

9. In combination, an electric circuit, circuit interrupting means therefor, means for controlling said interrupting means including a transmitter at one point of the circuit operative to transmit a predetermined frequency oscillation only during alternate half cycles of the circuit current at said point, receiving means at another point operative to receive said oscillation only during alternate half cycles of the circuit current at said other point, said receiving means including means for producing two similar quantities of electric energy dependent on the phase relation of current at said points and means responsive to a function of said quantities for controlling the operation of said circuit interrupting means.

10. In combination, an electric circuit, circuit interrupting means therefor and means for controlling the opening of said interrupting means including a transmitter at one point of the circuit operative to transmit a carrier wave of predetermined frequency only during alternate half cycles of the circuit current at said point, a receiver at another point of said circuit tuned to the frequency of said carrier wave and operative to receive said wave only during alternate half cycles of the circuit current at said other point, said receiver including means for producing two currents dependent on the phase relation of current at said points and directional relay means connected to be energized in accordance with the difference between said receiver currents for controlling the opening of said circuit interrupting means.

11. In combination, an electric circuit, circuit interrupting means therefor and means for controlling said circuit interrupting means including a transmitter coupled to said circuit at one point thereof and connected to be controlled in accordance with the circuit current at said point to transmit a carrier wave of a predetermined frequency only during alternate half cycles of the circuit current, a receiver coupled to said circuit at another point thereof, tuned to the frequency of said carrier wave and connected to receive said wave only during alternate half cycles of the circuit current at said other point, said receiver including means for producing two currents dependent on the phase relation of current at said points and means for effecting the opening of the circuit interrupter on the occurrence of a fault on said circuit between said points including a directional relay connected to be energized in accordance with the difference between said receiver currents.

MAURICE E. BIVENS.